(12) United States Patent
Agarwal et al.

(10) Patent No.: US 12,481,438 B2
(45) Date of Patent: Nov. 25, 2025

(54) DATA STORAGE DEVICE AND METHOD FOR HYBRID SPACE BALANCING BASED ON HOST READ AFFINITY AND HEURISTICS

(71) Applicant: Sandisk Technologies, Inc., Milpitas, CA (US)

(72) Inventors: Dinesh Kumar Agarwal, Bangalore (IN); Sunny Sharan, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/624,395

(22) Filed: Apr. 2, 2024

(65) Prior Publication Data
US 2025/0306784 A1 Oct. 2, 2025

(51) Int. Cl.
*G06F 3/06* (2006.01)
(52) U.S. Cl.
CPC .......... *G06F 3/0631* (2013.01); *G06F 3/0604* (2013.01); *G06F 3/0679* (2013.01)
(58) Field of Classification Search
CPC ..... G06F 3/0631; G06F 3/0604; G06F 3/0679
See application file for complete search history.

(56) References Cited

U.S. PATENT DOCUMENTS

| 6,615,308 | B1 | 9/2003 | Fanning |
| 9,176,862 | B2 * | 11/2015 | Chen ................... G11C 16/349 |
| 9,471,254 | B2 | 10/2016 | Shaharabany et al. |
| 9,804,801 | B2 | 10/2017 | Moon et al. |
| 10,090,044 | B2 | 10/2018 | Achtenberg et al. |
| 10,671,431 | B1 * | 6/2020 | Dolan ................... G06F 3/0649 |
| 11,030,106 | B2 | 6/2021 | Muthiah et al. |
| 11,580,021 | B2 * | 2/2023 | Bräutigam ........... G07C 5/0841 |
| 2015/0193302 | A1 * | 7/2015 | Hyun ................... G11C 29/028 |
| | | | 714/764 |
| 2015/0301763 | A1 * | 10/2015 | Shaharabany ...... G06F 12/0246 |
| | | | 711/147 |
| 2017/0068451 | A1 * | 3/2017 | Kenan ................... G06F 3/0659 |
| 2017/0177258 | A1 * | 6/2017 | Bates ................... G06F 3/0634 |
| 2019/0056886 | A1 * | 2/2019 | Nagarajan ............. G06F 3/0659 |
| 2020/0110537 | A1 * | 4/2020 | Hahn ....................... G06F 3/061 |
| 2020/0293441 | A1 * | 9/2020 | Lin ..................... G06F 13/1694 |

(Continued)

OTHER PUBLICATIONS

Ho, Joshua; "SanDisk Announces iNAND 7132: SLC/TLC Hybrid eMMC"; downloaded from the Internet at *SanDisk Announces iNAND 7132: SLC/TLC Hybrid eMMC* (anandtech.com) on Apr. 1, 2024; AnandTech; Mar. 2, 2015; 3 pages.

(Continued)

*Primary Examiner* — Sean D Rossiter
(74) *Attorney, Agent, or Firm* — Crowell & Moring LLP

(57) ABSTRACT

A data storage device and method for hybrid space balancing based on host read affinity and heuristics are provided. In one embodiment, a data storage device is provided comprising a memory and one or more processors. The one or more processors, individually or in combination, are configured to: receive information from a host regarding an incoming write workload of a burst operation; and dynamically adjust an amount of the memory configured as single-level cell (SLC) memory versus multi-level cell (MLC) memory based on the information to accommodate the burst operation. Other embodiments are disclosed.

17 Claims, 8 Drawing Sheets

1. Overall Amount of Writes/Reads
2. Performance and Affinity Towards Reads/Writes
3. Window Change Settings Hybrid Space = Function of (Affinity Towards Reads/Writes, Amount of SLC Reads, Amount of SLC Writes)

(56) References Cited

U.S. PATENT DOCUMENTS

2020/0401515 A1* 12/2020 Liang .................. G06F 12/0253
2022/0156008 A1  5/2022 Lee et al.
2022/0164123 A1*  5/2022 Kim ..................... G06F 3/0659
2024/0176527 A1*  5/2024 Peter .................... G06F 3/0647

OTHER PUBLICATIONS

International Search Report mailed Apr. 22, 2025 for International Application No. PCT/US2025/010811.
Written Opinion mailed Apr. 22, 2025 for International Application No. PCT/US2025/010811.
Search Strategy completed Apr. 22, 2025 for International Application No. PCT/US2025/010811.

* cited by examiner

DATA STORAGE DEVICE AND METHOD FOR HYBRID SPACE BALANCING BASED ON HOST READ AFFINITY AND HEURISTICS

BACKGROUND

Some parts of a memory of a data storage device can be configured as single-level cell (SLC) memory, and other parts of the memory can be configured as multi-level cell (MLC) (e.g., triple-level cell (TLC), quad-level cell (QLC), etc.) memory. In some data storage devices, part of the memory can be configured at "hybrid" memory (e.g., SLC memory that can be re-configured on demand as MLC memory), which can be beneficial in a burst mode where a relatively-large amount of data is received from a host for storage in the memory of the data storage device.

DETAILED DESCRIPTION

Figure 1A:
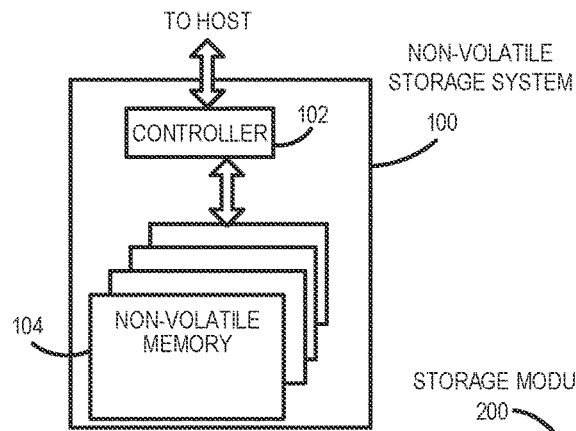
FIG. 1A is a block diagram of a data storage device of an embodiment.

The following embodiments generally relate to a data storage device and method for hybrid space balancing based on host read affinity and heuristics. In one embodiment, a data storage device is provided comprising a memory and one or more processors. The one or more processors, individually or in combination, are configured to: receive information from a host regarding an incoming write workload of a burst operation; and dynamically adjust an amount of the memory configured as single-level cell (SLC) memory versus multi-level cell (MLC) memory based on the information to accommodate the burst operation.

In some embodiments, the information comprises a number of read operations and a number of write operations in a window of time.

In some embodiments, a size of the window is dynamically adjustable.

In some embodiments, the window comprises a sliding window.

In some embodiments, the information comprises an indication of an affinity toward reads versus writes.

In some embodiments, the one or more processors, individually or in combination, are further configured move data from the SLC memory to the MLC memory in response to an indication of an affinity towards writes.

In some embodiments, the one or more processors, individually or in combination, are further configured move data from the MLC memory to the SLC memory in response to an indication of an affinity towards reads.

In some embodiments, the information is received from the host after the data storage device confirms, with the host, that the data storage device supports dynamic window sizing and hybrid adjustment.

In some embodiments, an amount of hybrid space in the memory is a function of an affinity towards reads verses writes, an amount of SLC reads, and an amount of SLC writes.

In some embodiments, the MLC memory comprises triple-level cell (TLC) memory.

In some embodiments, the MLC memory comprises quad-level cell (QLC) memory.

In some embodiments, the memory comprises a three-dimensional memory.

In another embodiment, a method is provided that is performed in a data storage device comprising a memory. The method comprises: determining whether a host is exhibiting, over a window of time, an affinity toward writes or an affinity toward reads; in response to determining that the host is exhibiting an affinity toward writes, moving data from a single-level cell (SLC) block of the memory to a multi-level cell (MLC) block of the memory; and in response to determining that the host is exhibiting an affinity toward reads, moving data from the MLC block of the memory to the SLC block of the memory.

In some embodiments, the method further comprises dynamically adjusting a size of the window.

In some embodiments, the window comprises a sliding window.

In some embodiments, an amount of hybrid space in the memory is a function of the affinity towards reads verses writes, an amount of SLC reads, and an amount of SLC writes.

In some embodiments, the MLC block of the memory comprises triple-level cell (TLC) memory.

In some embodiments, the MLC block of the memory comprises quad-level cell (QLC) memory.

In some embodiments, the memory comprises a three-dimensional memory.

In yet another embodiment, a data storage device is provided comprising: a memory; and means for dynamically adjusting an amount of the memory configured as single-level cell (SLC) memory versus multi-level cell (MLC) memory based on heuristics of the data storage device to accommodate a burst write from a host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1B:
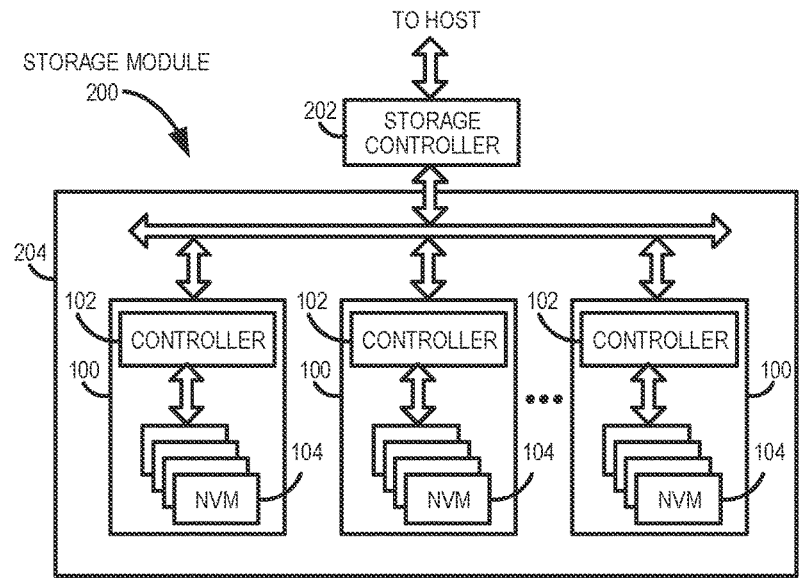
FIG. 1B is a block diagram illustrating a storage module of an embodiment.
Figure 1C:
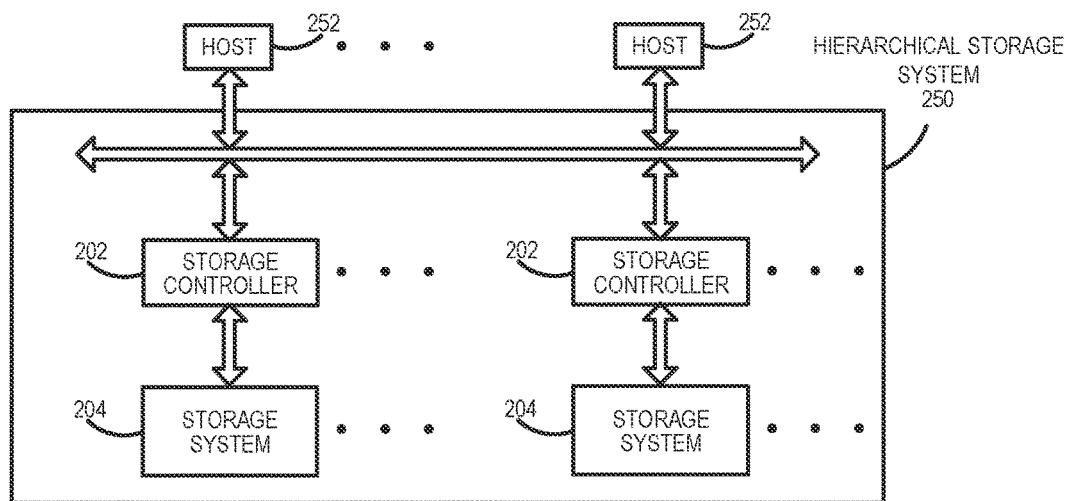
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
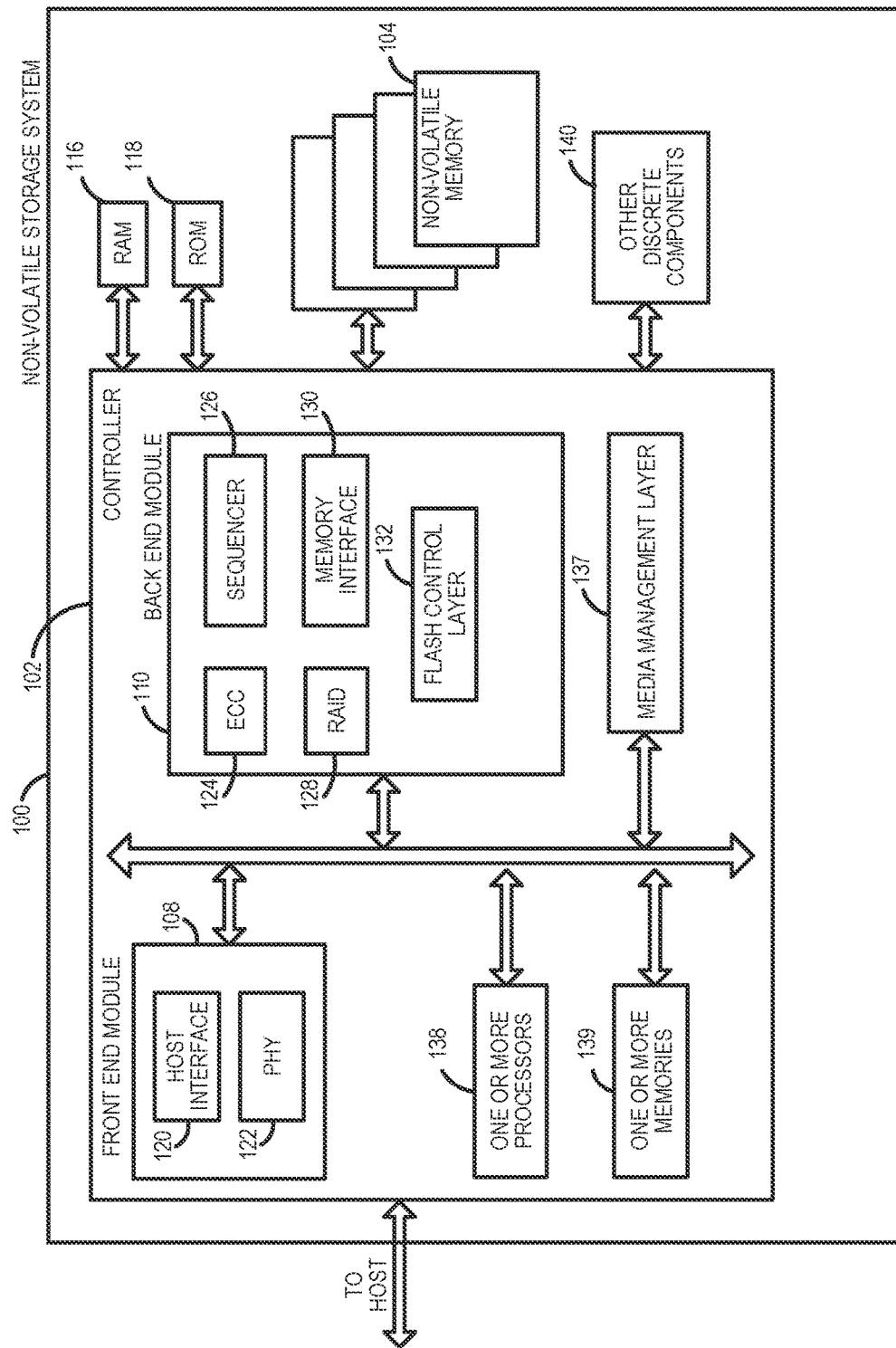
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
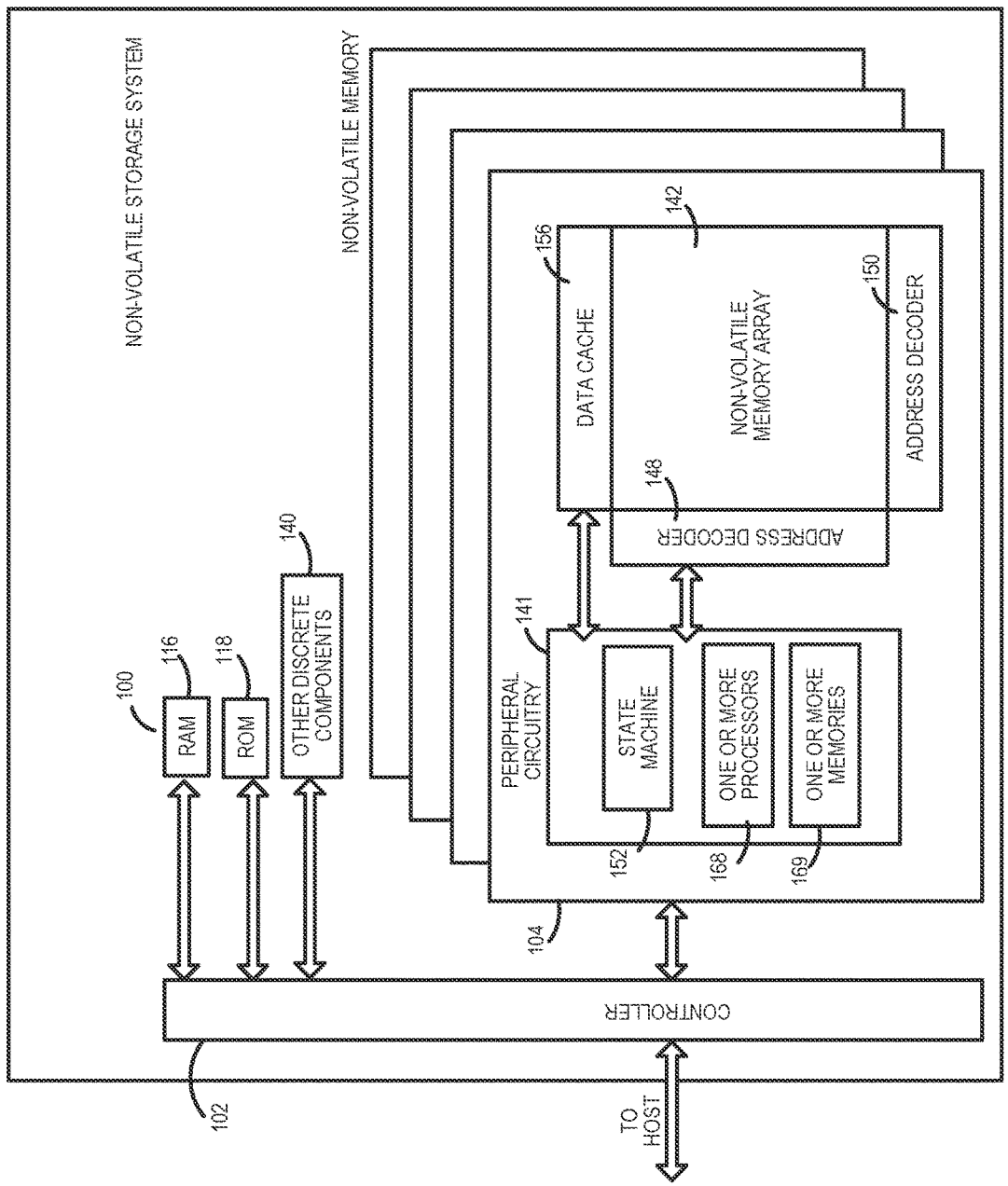
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
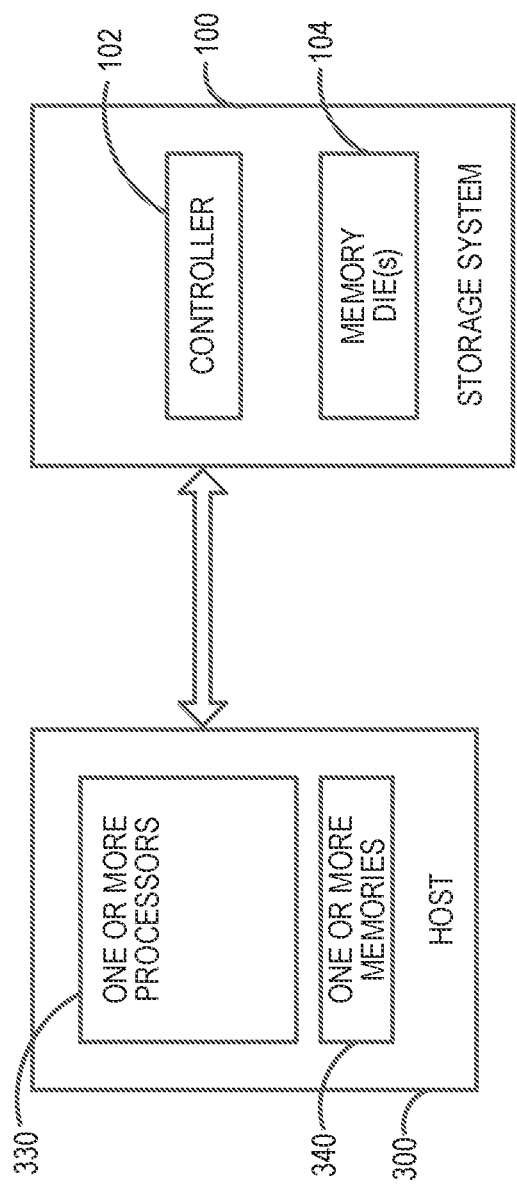
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Figure 4:
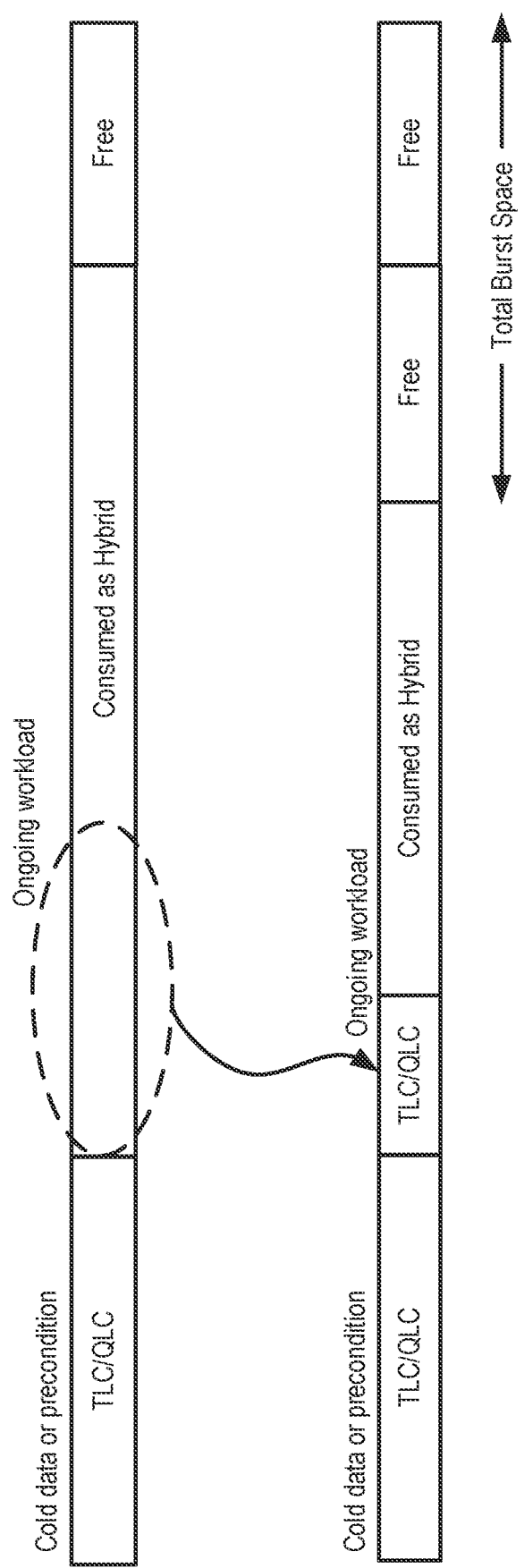
FIG. 4 is an illustration of a use of a hybrid memory of an embodiment.

As mentioned above, some parts of the memory 104 can be configured as single-level cell (SLC) memory, and other parts of the memory 104 can be configured as multi-level cell (MLC) (e.g., triple-level cell, quad-level cell, etc.) memory. In some embodiments, part of the memory 104 can be configured at "hybrid" memory (e.g., SLC memory that can be re-configured on demand as MLC memory), which can be beneficial in a burst mode where a relatively-large amount of data is received from the host for storage in the memory 104 of the data storage device 100. FIG. 4 is an illustration of a use of a hybrid memory of an embodiment. In the example shown in FIG. 4, the memory 104 comprises MLC (here, TLC, QLC) memory storing cold data (data that has not been or will not be accessed frequently or for some period of time), hybrid memory, and free memory blocks. As shown in FIG. 4, in a burst mode where a relative-large amount of data is received from the host 300 for storage in the memory 104, incoming data is stored in SLC blocks in the hybrid memory and is then folded into TLC/QLC blocks in the hybrid memory. This increase the total burst space available in the memory 104 and increases write performance.

In many situations, hybrid space is created in advance, and burst space is created to accommodate writes. When the data storage device 100 does not have much space left, most of this work is done by converting the current hybrid blocks to TLC/QLC. One possible problem with this approach is that the created hybrid space is generally fixed or depends on the fullness of the memory 104. As such, there is no way to optimally tie the hybrid space to an incoming workload and be dynamic based on a changing workload.

The following embodiments can be used to address this issue by creating hybrid space based on an indication of incoming workload and/or based on device heuristics in a given window of time and/or the host's affinity for writes versus reads. In one embodiment, dynamic burst space balancing is provided based on a host indication of an incoming workload. In another embodiment, the controller 102 of the data storage device 100 can move data from a SLC block to an MLC block if an immediate window indication shows an affinity towards writes and can be based on a weightage of write performance in the window. In yet another embodiment, the controller 102 of the data storage device 100 can create hybrid burst space by moving data from an MLC block to an SLC block if the immediate window indication shows an affinity towards reads and can based on the read performance in the window. Also, device heuristic in a smaller window can be used to track an affinity towards reads and writes and can be adjusted for hybrid space in the next sliding window.

Figure 5:
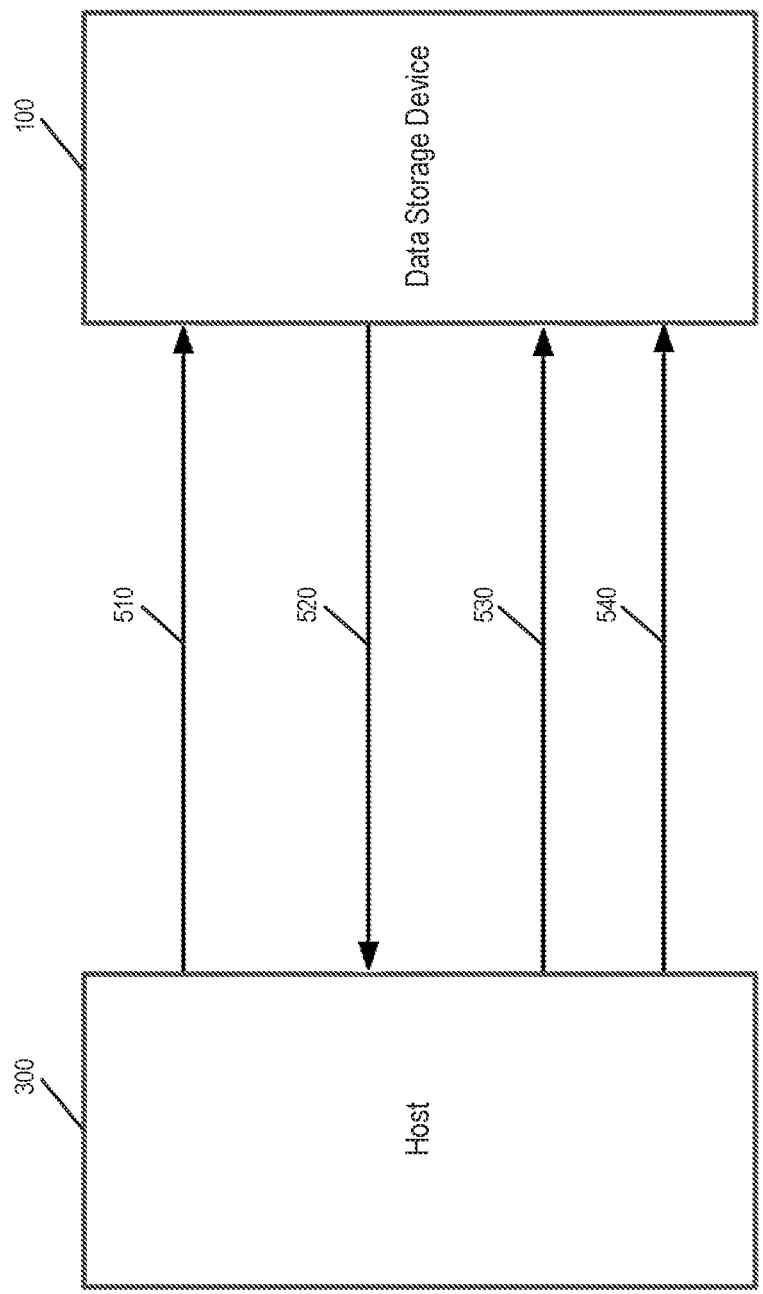
FIG. 5 is a block diagram of a host and a data storage device of an embodiment that illustrates a hybrid burst balancing method.

Turning again to the drawings, FIG. 5 is a block diagram that illustrates a hybrid burst balancing method of an embodiment. In this embodiment, the data storage device 100 receives an indication of performance affinity of reads/writes and an amount of reads/writes as per a window configuration. The window configuration can be changed whenever applicable to adjust the hybrid space. More specifically, the host 300 first checks if the data storage device 100 supports dynamic window sizing and hybrid memory adjustment and, if these are supported, sends performance weightage requirements to the data storage device 100 (act 510). Next, the data storage device 100 responds if the hybrid memory can be adjusted with the specific requirements (act 520). The host 300 then sends, to the data storage device 100, the window size and read performance weightage or reads/writes in the window (act 530). Finally, window size updating and bookkeeping can take place (act 540).

Figure 6:
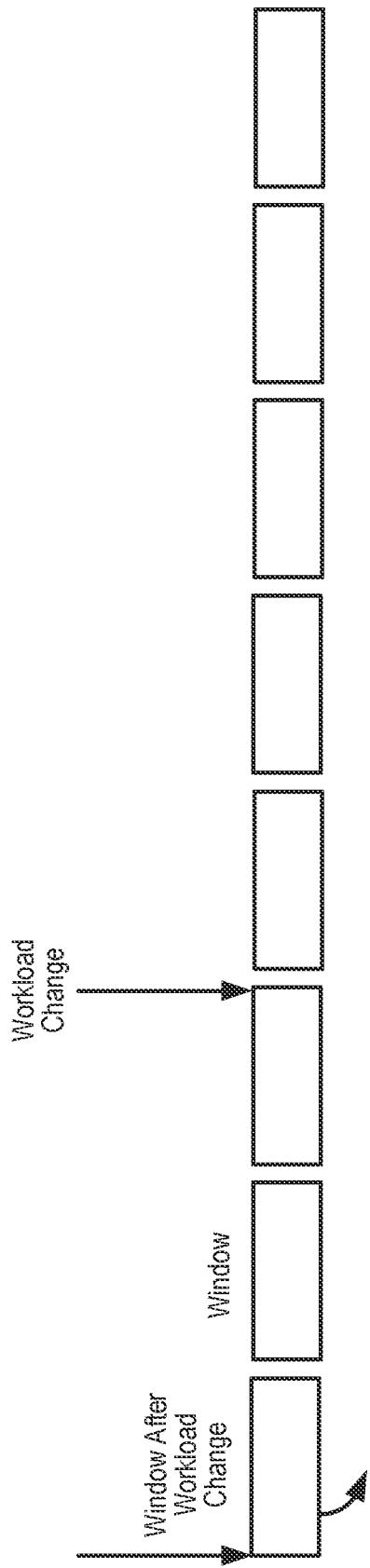
FIG. 6 is diagram that illustrates a method of an embodiment for hybrid space balancing based on host read affinity and heuristics.

As mentioned above, some embodiments can define the window and the read affinity in the window and provide workload change for hybrid burst balancing. The controller 102 of the data storage device 100 can define the window and change the hybrid burst towards reads or writes and maximize the performance. FIG. 6 illustrates an example of window and burst management. FIG. 6 shows a plurality of windows, including a window after a workload change. In this example, the overall amount of writes/reads is determined, as well as performance and affinity towards reads/writes and window change settings. Here, the hybrid space is a function of affinity toward reads/writes, the amount of SLC reads, and the amount of SLC write.

Weightage of small reads and writes can impact the overall performance. To address this, the controller 102 of the data storage device 100 can define the hybrid management in the window, track the performance affinity towards reads and writes in the window, and adjust the hybrid burst. The weightage of small reads and writes can impact the overall performance, so the controller 102 of the data storage device 100 can define the hybrid management in the window, track the performance affinity towards reads and writes in the window, and adjust the hybrid burst. For example, the contribution toward overall performance can be high but the amount of data can be low, and the affinity to reads can keep changing in the window. That is, even if the write/read amount changes, the overall contribution of the workload in terms of weightage can remain high. So, some workloads can have very low reads and high writes but can have very high weightage. The net bandwidth can be used for calculations. Also, there can be a high variance in write/read performance for SLC and MLC. Giving a preference to write is beneficial in some workloads, while giving a preference to reads is beneficial in other workloads. This can be determined by defining the performance affinity towards reads/writes.

Some workloads can show a high affinity towards reads. In other workloads, the hybrid memory can be read from a deep partition, but the performance may be low. So, the burst space can be skewed in terms of writes, but it sometimes works in favor for overall performance and sometimes results in a performance drop. This can depend on the performance affinity towards reads, which can be decided dynamically.

Regarding hybrid burst adjustment in the window, once it is detected that, for a given window, the affinity of the writes is higher and percent writes are below a threshold, a hybrid adjustment can be done for given data. For example, the controller 102 of the data storage device 100 can move data from SLC to MLC if the immediate window indication shows an affinity towards writes and based on the weightage of write performance in window. Once it is detected that, for the given window, the affinity of the read is higher and the percent reads are below a threshold, the controller 102 can perform a hybrid adjustment for given data.

Figure 7:
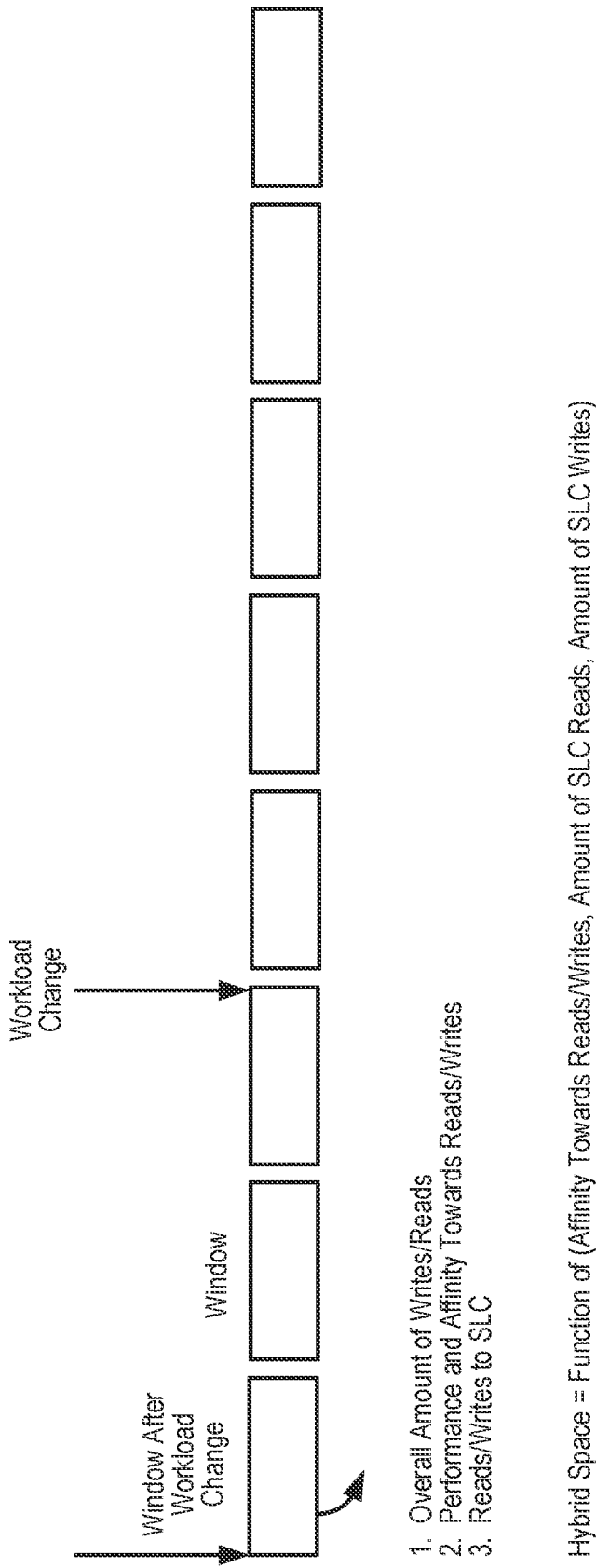
FIG. 7 is diagram that illustrates a method of an embodiment for hybrid space balancing based on host read affinity and heuristics.

In another embodiment, the window, read affinity, and amount of data can be tracked based on heuristics of the data storage device 100. In this embodiment, the controller 102 of the data storage device 100 can maintain a window and keep adjusting the window based on the read/write percentage, as well as track the overall read/write data in the window to try to maximize the net data, which decides performance. Other aspects of the prior embodiments can be used in this embodiment. This embodiment is illustrated in FIG. 7. FIG. 7 shows a plurality of windows, including a window after a workload change. In this example, the overall amount of writes/reads is determined, as well as performance and affinity towards reads/writes and reads/ writes to SLC. Here, the hybrid space is a function of affinity toward reads/writes, the amount of SLC reads, and the amount of SLC writes.

There are several advantages associated with these embodiments. For example, these embodiments can be used to increase hybrid utilization based on workload and improve performance for the mixed performance and user workloads.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
one or more processors, individually or in combination, configured to:
  receive information from a host regarding an incoming write workload of a burst operation, wherein the information comprises a number of read operations and a number of write operations in a window of time, and wherein a size of the window is dynamically adjustable; and
  dynamically adjust an amount of the memory configured as single-level cell (SLC) memory versus multi-level cell (MLC) memory based on the information to accommodate the burst operation.

2. The data storage device of claim 1, wherein the window comprises a sliding window.

3. The data storage device of claim 1, wherein the information comprises an indication of an affinity toward reads versus writes.

4. The data storage device of claim 3, wherein the one or more processors, individually or in combination, are further configured move data from the SLC memory to the MLC memory in response to an indication of an affinity towards writes.

5. The data storage device of claim 3, wherein the one or more processors, individually or in combination, are further configured move data from the MLC memory to the SLC memory in response to an indication of an affinity towards reads.

6. The data storage device of claim 1, wherein the information is received from the host after the data storage device confirms, with the host, that the data storage device supports dynamic window sizing and hybrid adjustment.

7. The data storage device of claim 1, wherein an amount of hybrid space in the memory is a function of an affinity towards reads verses writes, an amount of SLC reads, and an amount of SLC writes.

8. The data storage device of claim 1, wherein the MLC memory comprises triple-level cell (TLC) memory.

9. The data storage device of claim 1, wherein the MLC memory comprises quad-level cell (QLC) memory.

10. The data storage device of claim 1, wherein the memory comprises a three-dimensional memory.

11. A method comprising:
performing in a data storage device comprising a memory:
  determining whether a host is exhibiting, over a window of time, an affinity toward writes or an affinity toward reads;
  in response to determining that the host is exhibiting an affinity toward writes, moving data from a single-level cell (SLC) block of the memory to a multi-level cell (MLC) block of the memory; and
  in response to determining that the host is exhibiting an affinity toward reads, moving data from the MLC block of the memory to the SLC block of the memory;
wherein an amount of hybrid space in the memory is a function of the affinity towards reads verses writes, an amount of SLC reads, and an amount of SLC writes.

12. The method of claim 11, further comprising dynamically adjusting a size of the window.

13. The method of claim 11, wherein the window comprises a sliding window.

14. The method of claim 11, wherein the MLC block of the memory comprises triple-level cell (TLC) memory.

15. The method of claim 11, wherein the MLC block of the memory comprises quad-level cell (QLC) memory.

16. The method of claim 11, wherein the memory comprises a three-dimensional memory.

17. A data storage device comprising:
a memory; and
means for:
  receiving information from a host regarding an incoming write workload of a burst operation, wherein the information is received from the host after the data storage device confirms, with the host that the data storage device supports dynamic window sizing and hybrid adjustment; and
  dynamically adjusting an amount of the memory configured as single-level cell (SLC) memory versus multi-level cell (MLC) memory based on the information to accommodate the burst operation.

* * * * *